(12) United States Patent
Albert et al.

(10) Patent No.: US 12,241,482 B2
(45) Date of Patent: Mar. 4, 2025

(54) PISTON ACCUMULATOR

(71) Applicant: HYDAC TECHNOLOGY GMBH, Sulzbach/Saar (DE)

(72) Inventors: Alexander Albert, Wallerfangen (DE); Dennis Christopher Lang, St. Ingbert (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 129 days.

(21) Appl. No.: 18/071,128

(22) Filed: Nov. 29, 2022

(65) Prior Publication Data
US 2023/0090796 A1 Mar. 23, 2023

Related U.S. Application Data

(62) Division of application No. 16/966,576, filed as application No. PCT/EP2019/051200 on Jan. 18, 2019, now Pat. No. 11,542,962.

(30) Foreign Application Priority Data

Feb. 9, 2018 (DE) ..................... 10 2018 001 104.7

(51) Int. Cl.
*F15B 1/24* (2006.01)
*F15B 20/00* (2006.01)
*F16J 1/09* (2006.01)

(52) U.S. Cl.
CPC .............. *F15B 1/24* (2013.01); *F15B 20/005* (2013.01); *F16J 1/09* (2013.01); *F15B 20/00* (2013.01);
(Continued)

(58) Field of Classification Search
CPC ...... F04B 1/0443; F04B 53/04; F15B 15/223; F15B 15/227; F15B 21/044;
(Continued)

(56) References Cited

U.S. PATENT DOCUMENTS

| 1,536,686 A | 5/1925 | Mullen |
| 2,022,724 A | 12/1935 | Kudolla |

(Continued)

FOREIGN PATENT DOCUMENTS

| DE | 967721 | 12/1957 |
| DE | 10 2013 010 344 | 10/2014 |

(Continued)

OTHER PUBLICATIONS

International Search Report (ISR) issued Apr. 15, 2019 in corresponding International (PCT) Application No. PCT/EP2019/051200.

*Primary Examiner* — Robert K Arundale
*Assistant Examiner* — Richard K. Durden
(74) *Attorney, Agent, or Firm* — Wenderoth, Lind & Ponack, L.L.P.

(57) ABSTRACT

A piston accumulator has an accumulator housing and a separating piston (8) guided for longitudinal motion in the accumulator housing. The separating piston separates a liquid side (4) from a gas side (10) in the accumulator housing. Liquid unintentionally transitions from the liquid side (4) to the gas side (10) despite a piston seal on the separating piston (8). By a return device (28), the transitioned liquid is at least partially returned from the gas side (10) of the accumulator housing to the liquid side (4) of the accumulator housing.

9 Claims, 8 Drawing Sheets

(52) U.S. Cl.
CPC ..... *F15B 2201/205* (2013.01); *F15B 2201/31* (2013.01); *F15B 2201/312* (2013.01); *F15B 2201/411* (2013.01); *F15B 2201/50* (2013.01)

(58) Field of Classification Search
CPC ............ F15B 2201/32; F15B 2201/411; F15B 2201/435; F16F 9/067; F16F 9/49; F16T 1/14; F16T 1/383; F17D 3/14; Y10S 55/17; Y10T 137/3025; Y10T 137/3031; Y10T 137/3043; Y10T 137/3062; Y10T 137/3102; Y10T 137/3105; Y10T 137/7326; Y10T 137/3024
USPC ...................................... 92/81, 82, 86, 181 P
See application file for complete search history.

(56) References Cited

U.S. PATENT DOCUMENTS

| | | | |
|---|---|---|---|
| 2,125,145 A | 7/1938 | Aikman | |
| 2,342,355 A | 2/1944 | Mercier | |
| 2,683,467 A | 7/1954 | Greer | |
| 2,780,504 A * | 2/1957 | Russell | F15B 1/24 92/155 |
| 2,817,361 A | 12/1957 | Mercier | |
| 2,876,799 A | 3/1959 | Mercier | |
| 2,990,841 A * | 7/1961 | Haddad | F16T 1/14 137/178 |
| 3,032,051 A | 5/1962 | Miller | |
| 3,130,741 A * | 4/1964 | Vetere | F16T 1/14 137/115.26 |
| 3,965,317 A | 6/1976 | Gratzmuller | |
| 3,969,092 A | 7/1976 | Huffman | |
| 4,461,322 A * | 7/1984 | Mills | F16L 55/05 138/31 |
| 4,509,409 A * | 4/1985 | Reeves | F04B 9/107 92/181 P |
| 4,577,663 A | 3/1986 | Andersen | |
| 4,813,446 A | 3/1989 | Silverwater | |
| 5,433,194 A * | 7/1995 | Fry | F16T 1/14 128/205.27 |
| 6,247,487 B1 | 6/2001 | Skill | |
| 6,923,215 B2 * | 8/2005 | Weber | F15B 1/24 138/31 |
| 7,117,783 B2 * | 10/2006 | Ursan | F04B 9/103 92/159 |
| 8,267,123 B2 | 9/2012 | LeBlanc | |
| 8,371,336 B2 * | 2/2013 | Nakaoka | F15B 1/103 138/30 |
| 9,541,099 B2 | 1/2017 | Pekarsky | |
| 9,709,077 B2 | 7/2017 | Shah | |

FOREIGN PATENT DOCUMENTS

| | | | | |
|---|---|---|---|---|
| DE | 10 2014 010 006 | | 1/2016 | |
| EP | 0 907 030 | | 4/1999 | |
| GB | 755342 A | * | 8/1956 | ............... F15B 1/24 |
| JP | 3642058 B2 | | 4/2005 | |

* cited by examiner

PISTON ACCUMULATOR

REFERENCE TO RELATED APPLICATION

This application is a division of U.S. patent application Ser. No. 16/966,576, filed Jul. 31, 2020, the subject matter of which is incorporated herein by reference.

FIELD OF THE INVENTION

The invention relates to a piston accumulator, having an accumulator housing and a separating piston guided for longitudinal motion therein. The separating piston separates a liquid side from a gas side in the accumulator housing. Liquid unintentionally transitions from the liquid side to the gas side despite a piston seal on the separating piston.

BACKGROUND OF THE INVENTION

Piston accumulators of this type are state of the art and are frequently used as hydropneumatic pressure accumulators in hydraulic circuits, for instance in hydraulic brake systems, hydraulic steering systems, suspension systems or the like, for instance to smooth pressure fluctuations. In this respect, DE 10 2014 010 006 A1 shows a piston accumulator of the genus mentioned above used as a pulsation damper by way of example.

A basic requirement for use in these areas is a long, trouble-free operating life. However, in practice this goal is encountered by the unintentional transition of hydraulic fluid into the gas side, which cannot be completely prevented. This transition results in the pressure/volume characteristic curve, required for the efficient action of the piston accumulator, deteriorating because of the transitioned fluid. A proper functioning is then limited in time.

SUMMARY OF THE INVENTION

With regard to this problem, the invention addresses the object of providing a piston accumulator that ensures a long, trouble-free operating life.

According to the invention, this object is solved by a piston accumulator having, as an essential feature of the invention, a return device. By the return device, the transitioned liquid is at least partially returned from the gas side of the accumulator housing to the liquid side of the accumulator housing. As a result of that return of transitioned liquid, an at least significant change in the free gas volume of the gas side is prevented during operation, and the optimum course of the pressure/volume characteristic curve is maintained. A trouble-free operation of the piston accumulator according to the invention is then ensured over long periods of time.

In advantageous embodiments, the return device has a float, which is guided longitudinally in a guide of the separating piston. Upon floating upwards under the influence of the liquid on the gas side of the accumulator housing, the float releases a path to a non-return valve. When in the opened state, the non-return valve releases a connection between this guide and the liquid side in the accumulator housing. If the non-return valve is adjusted in such a way that it opens at a pressure on the gas side that exceeds the pressure on the liquid side by a preferably small differential pressure $\Delta p$, in automatic operation a return process occurs as soon as there is no pressure equilibrium between the gas side and the liquid side, as when the separating piston has run against a closing cover of the accumulator housing. The float ball then is floated upwards due to hydraulic fluid on the gas side, and thus, releases the path to the non-return valve.

Advantageously, the arrangement in this case is such that the guide for the float is closed by a barrier for the float towards the gas side of the accumulator housing. The barrier is permeable to liquid. This prevents the float ball from floating out of the guide. The float may be a float ball or a float plate. When moved in the direction of the non-return valve, the float is supported by a further barrier having fluid passages and closes these fluid passages.

In a modified embodiment, the return device has a control piston, which is movably guided in the separating piston. The control piston has an inner chamber, which can be filled with transitioned liquid and which can be moved into an open position by the action of an energy storage device. In the open position, the chamber is connected to the liquid side via a non-return valve, which blocks in the direction of the gas side.

To ensure a pressure-tight closure of the gas side towards the liquid side when there is a high excess pressure on the gas side, for instance when the liquid side is unpressurized, the arrangement in the above-mentioned embodiment is such that the control piston, by running against the end cover against the action of the energy storage device, can be moved out of the open position into a position, in which a closing element located on the control piston blocks the connection between the filling chamber and the liquid side.

In another advantageous embodiment, the return device has an actuating piston, which, against the action of an assigned energy storage device, upon pressurization, actuates at least one non-return valve guided in the separating piston.

Advantageously, the arrangement is such that the non-return valve in the separating piston has a spring-loaded control pin. That control pin can be actuated on by the pressurized actuating piston when the separating piston approaches the end cover of the accumulator housing.

The volume of liquid accumulated on the gas side of the accumulator housing can be detected by a sensor. Starting from a predeterminable limit volume of liquid, the sensor actuates a control valve in such a way that it releases the pressurization for the actuating piston of the return device such that the return occurs via the opened non-return valve.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 6:
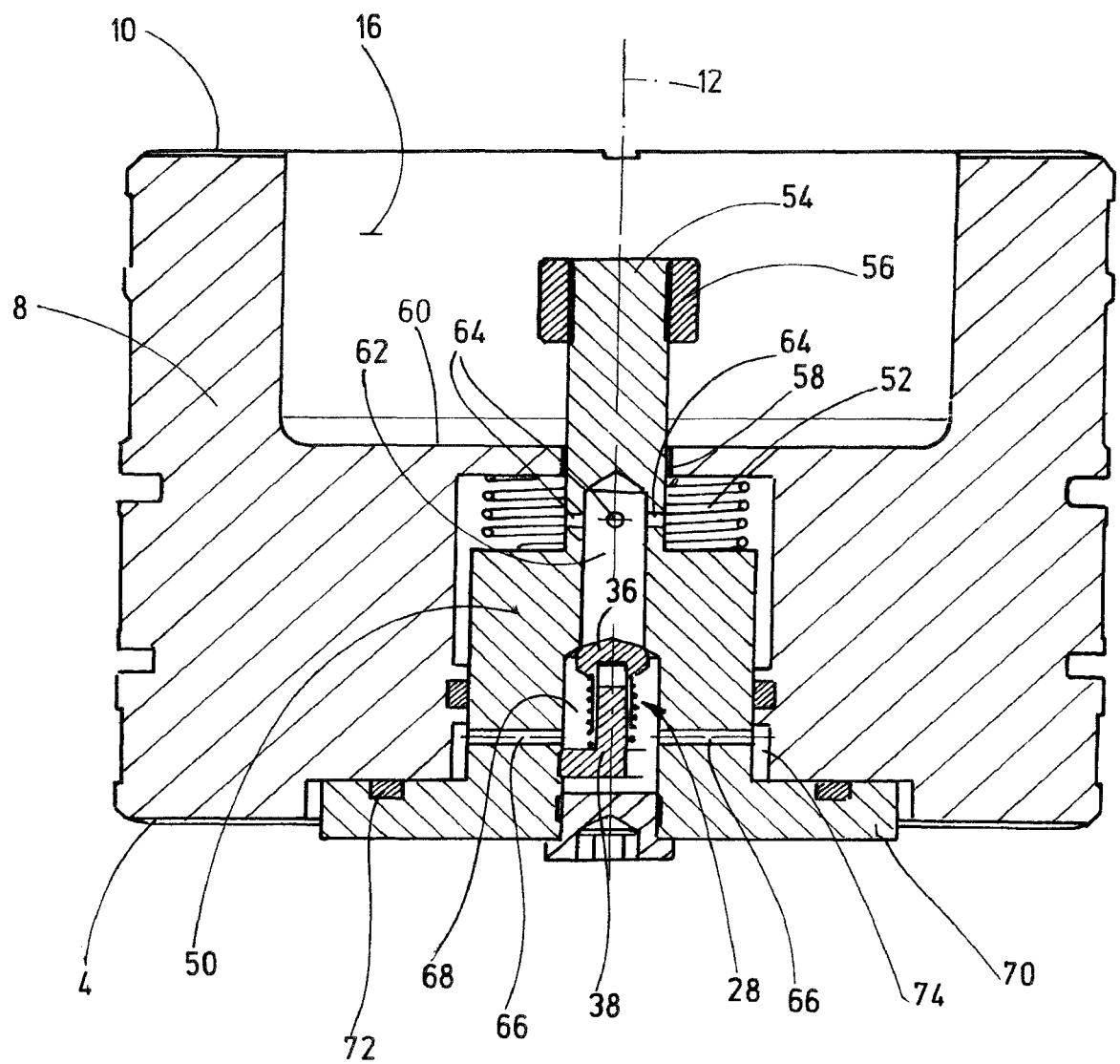
Figure 7:
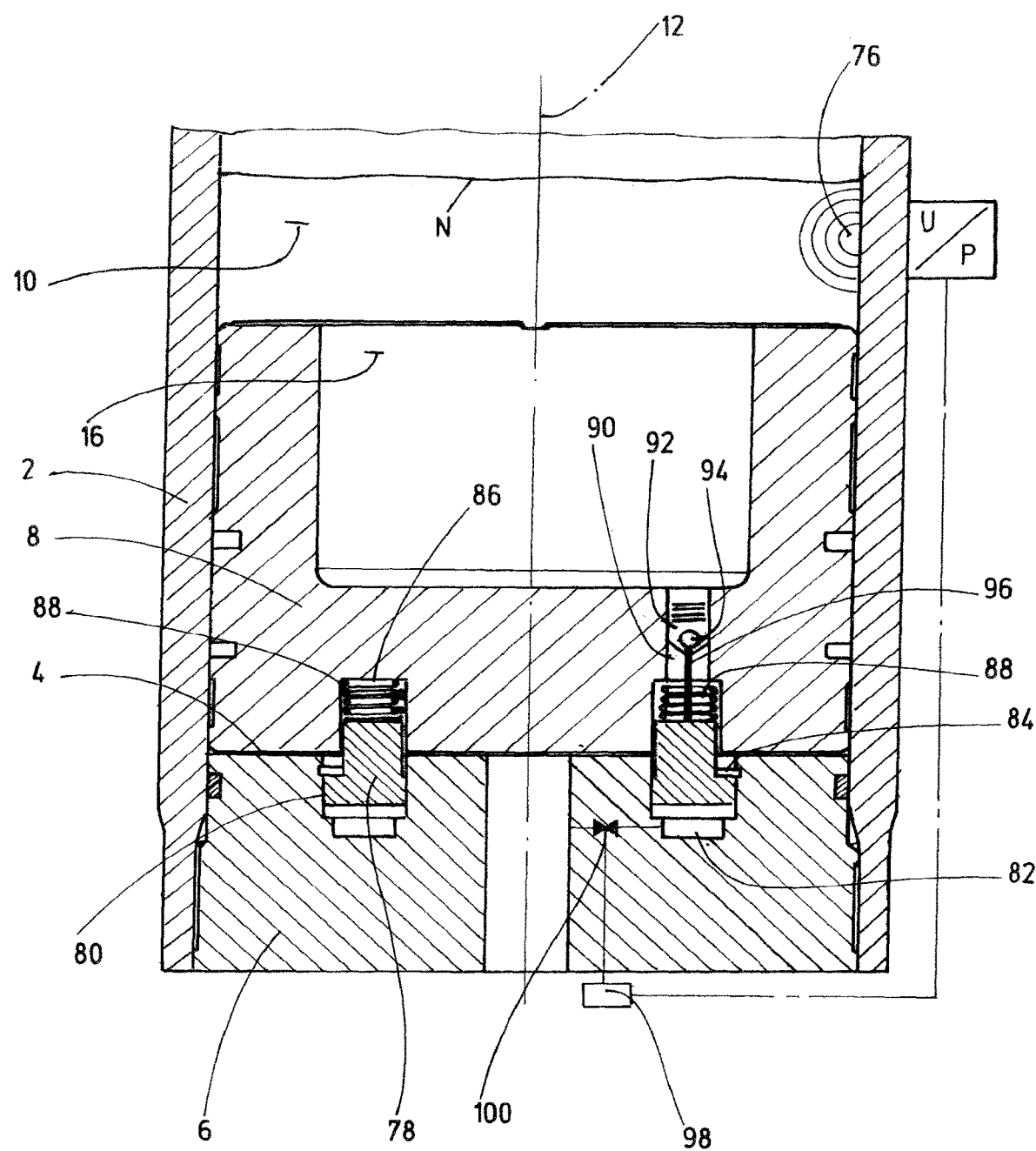
FIGS. 7 and 8 are partial side views in section of a piston accumulator adjacent to the liquid side according to a fourth exemplary embodiment of the invention, wherein the first operating state and the second operating state of the return device are shown, respectively.
Figure 8:
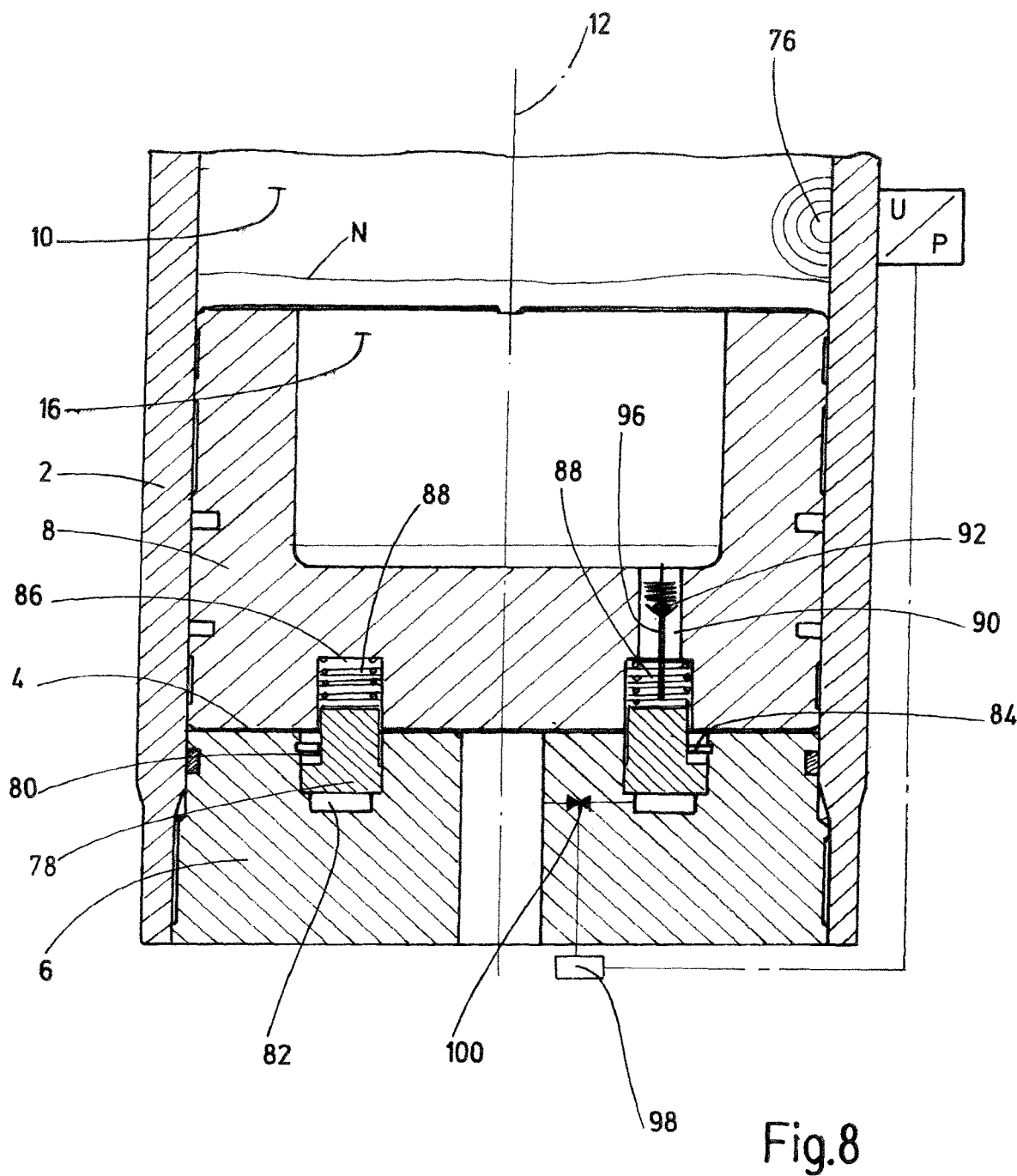

Of the embodiments, shown in the drawings, of the piston accumulator according to the invention, only FIGS. 7 and 8 show an end region of the accumulator housing 2. An end cover 6 forms the housing closure on the fluid side 4 located at that end region. A separating piston 8 is freely displaceably guided in the accumulator housing 2, separates the fluid side 4 from a gas side 10 and is shown in an end position contacting the cover 6. In each of the remaining FIGS. 1 to 6, the separating piston 8 is shown separately without any assigned housing parts.

Figure 1:
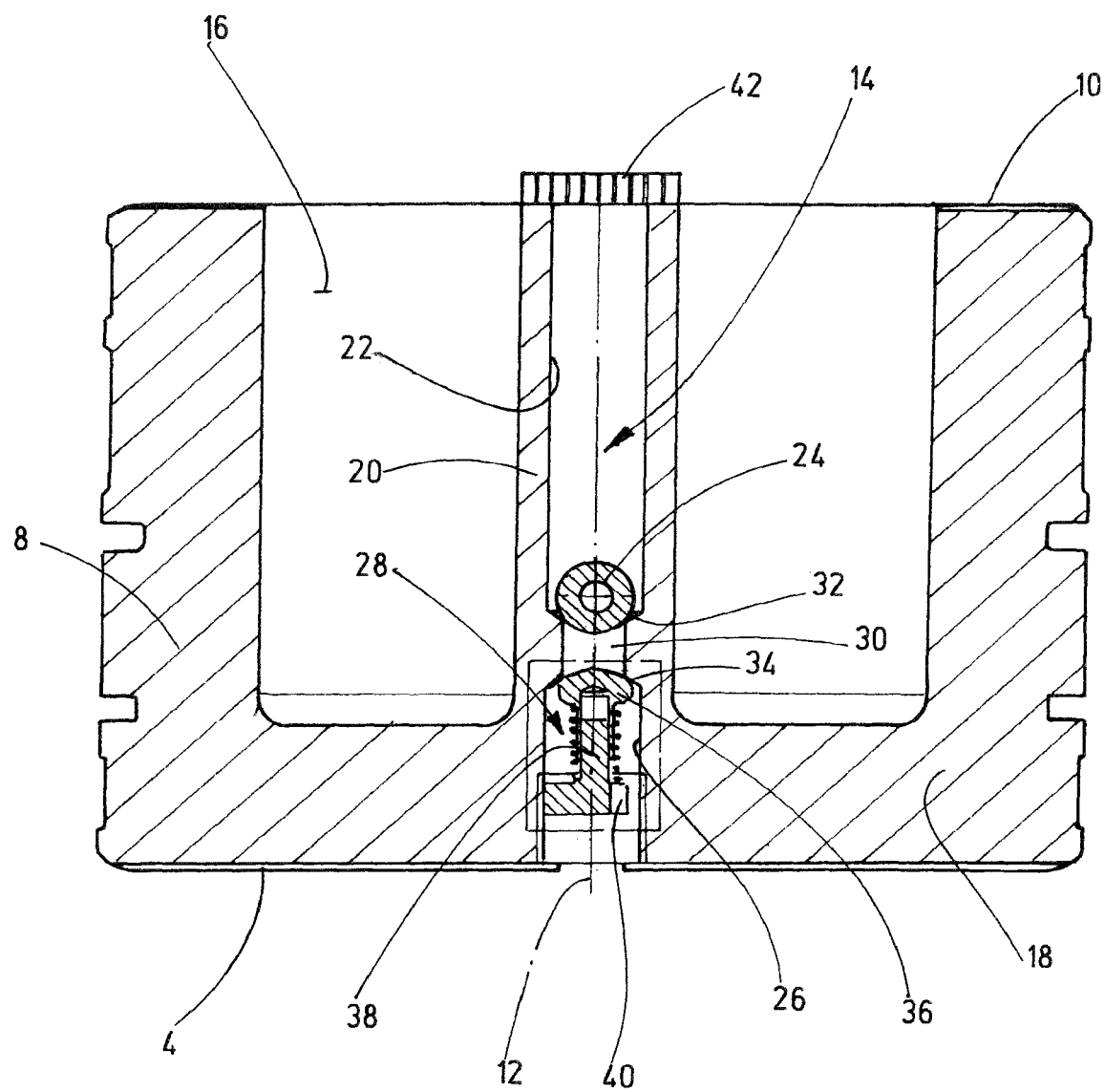
FIGS. 1 and 2 are side views in section of a separating piston of a piston accumulator according to a first exemplary embodiment invention, wherein a first operating state and a second operating state of the return device, respectively, are shown.
Figure 2:
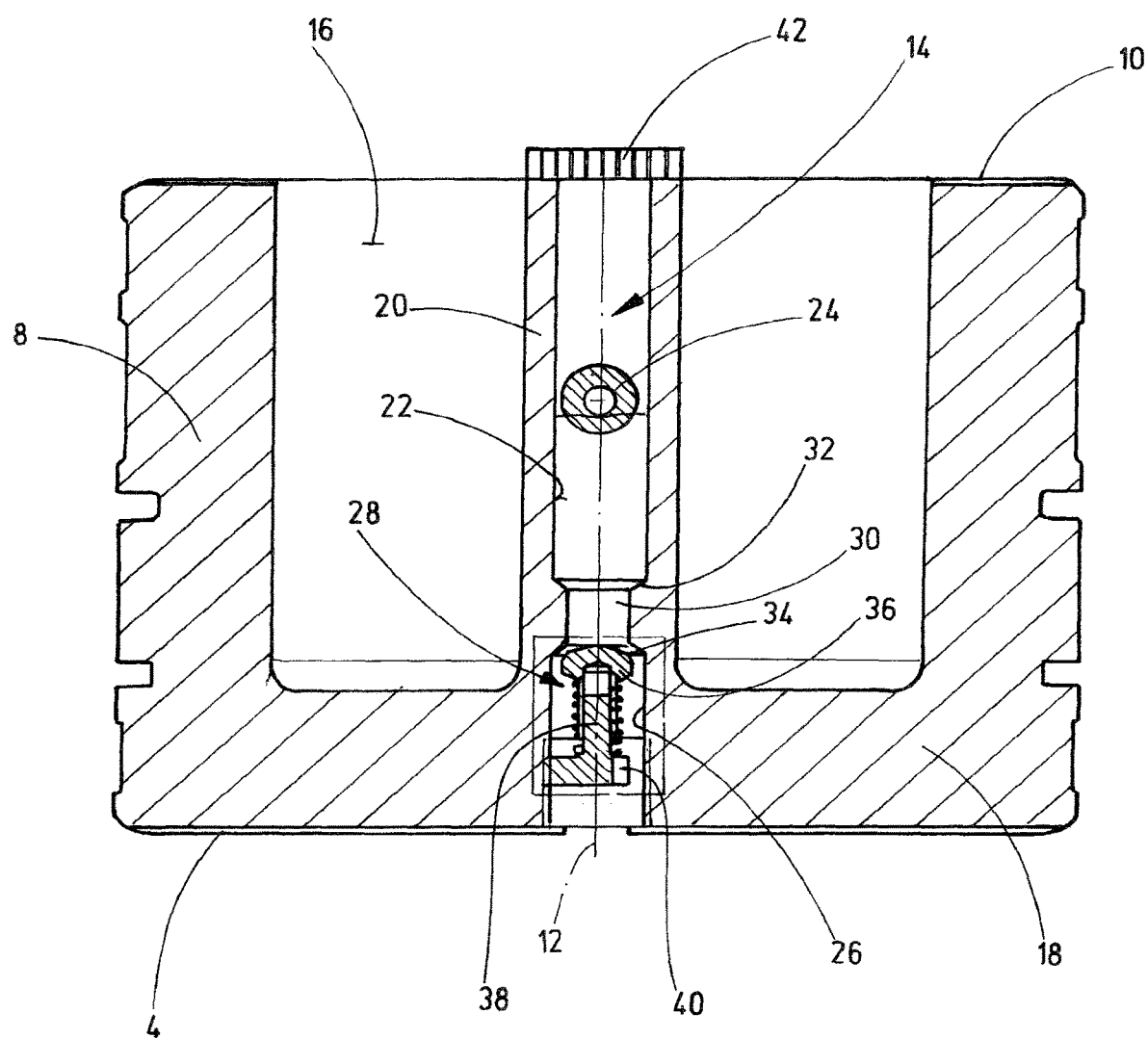

FIGS. 1 and 2 show a first exemplary embodiment, in which the separating piston 8 has a passage 14 that is coaxial to the cylinder axis 12. The return device is located in the passage 14. As usual for piston accumulators, the separating piston 8 is bowl-shaped to increase the volume of the gas side 10. The inner cavity 16 of the bowl extends from the piston base 18, shown at the bottom in the drawing, with its open end to the piston end at the gas side 10. The passage 14 for the return device is located in a tubular body 20 extending from the piston base 18 to the gas-side piston end and is coaxial with the axis 12. The passage 14 is formed by a drilled hole. The inside diameter of passage 14 is stepped, having a first section starting from the gas-side piston end and forming a guide 22 for a float ball 24, and having a second section starting at the end at the piston base 18 and having the same diameter as the guide 22. The second section forms a valve housing 26 for a standard non-return valve 28. Between the guide 22 and the valve housing 26, there is an intermediate section 30 having a reduced internal diameter. The intermediate section 30 forms, at the side facing the guide 22, a seal seat 32 for interaction with the float ball 24. At the end facing the valve housing 26, a seal seat 34 is formed for the spring-loaded closing element 36 of the non-return valve 28. The valve housing 36 is guided on a holder 38, which leaves free a passage 40 in the valve housing 36, through which return fluid can pass when the non-return valve 28 is open.

FIG. 1 shows the operating state without transitioned liquid accumulated in the cavity 16 of the separating piston 8. The float ball 24 is not floating, but rests on the seal seat 32 at the intermediate section 30. To ensure that the float ball 24 floats when liquid, such as hydraulic oil, has transitioned into the gas side 10, the float ball 24 may be made of titanium or plastic, for instance by 3D printing and is designed as a hollow ball. FIG. 2 shows a position of the floated float ball 24, which is lifted off its seal seat 32. If there is a pressure difference Δp between the gas side 10 and the liquid side 4 on the outside of the piston base 28, the valve housing 36 of the non-return valve 28 is pressurized, opening the non-return valve 28. Non-return valve 26 is preferably set to a low opening pressure, letting the liquid from the gas side 10 flow back to the liquid side 4 via the guide 22. To prevent the float ball 24 from floating out of the guide 22, a plastic plate 42 having liquid passages is glued or screwed or otherwise connected to the end of the tubular body 20. To initiate a return process and to create excess pressure on the gas side to open the non-return valve, the pressure on the liquid side 4 is reduced, resulting in the separating piston 8 running against the housing end cover 6 (only shown in FIGS. 7 and 8).

Figure 3:
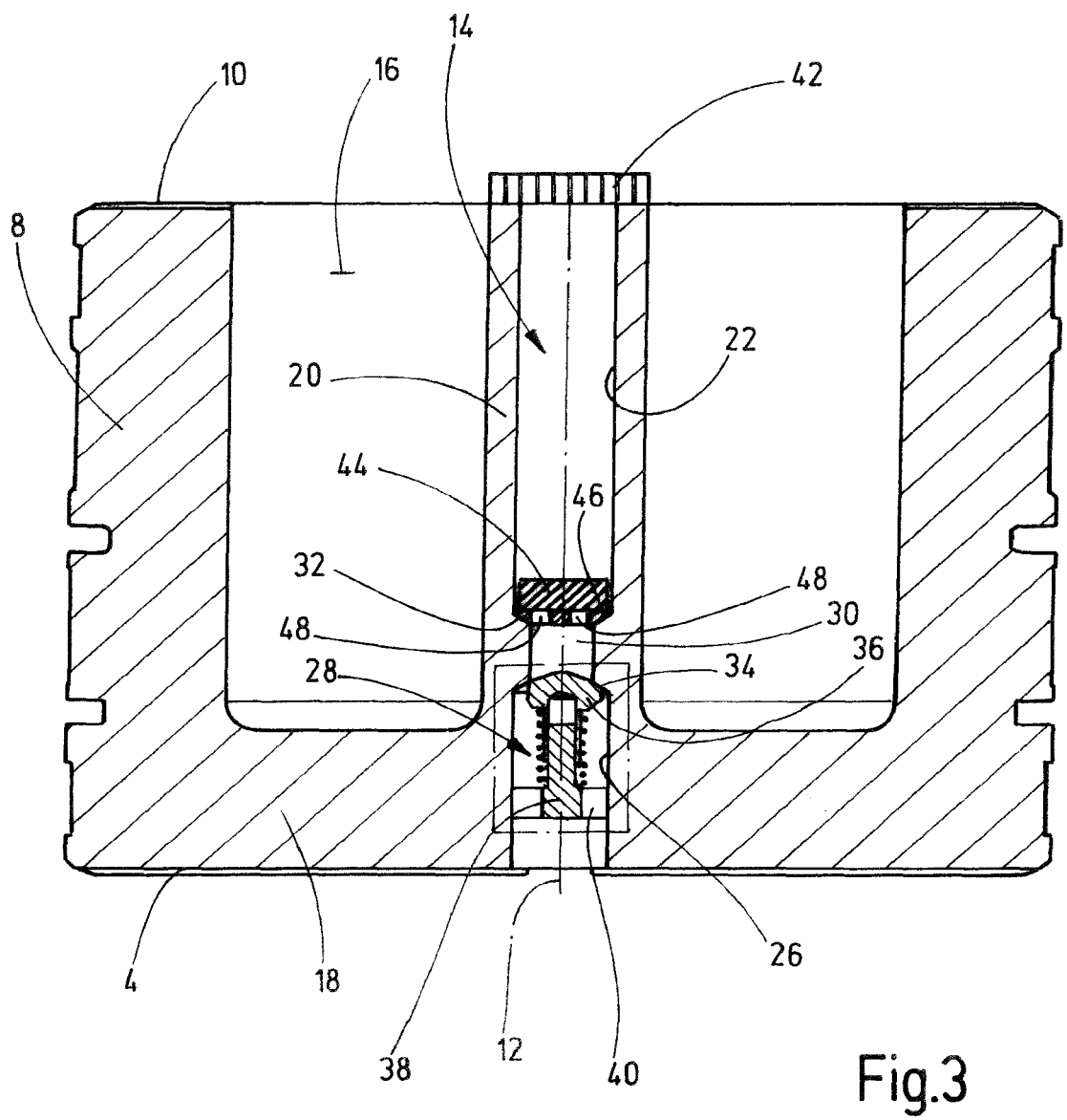
FIGS. 3 and 4 are side views in section of a separating piston of a piston accumulator according to a second exemplary embodiment of the invention, wherein the first operating state and the second operating state of the return device, respectively, are shown.
Figure 4:
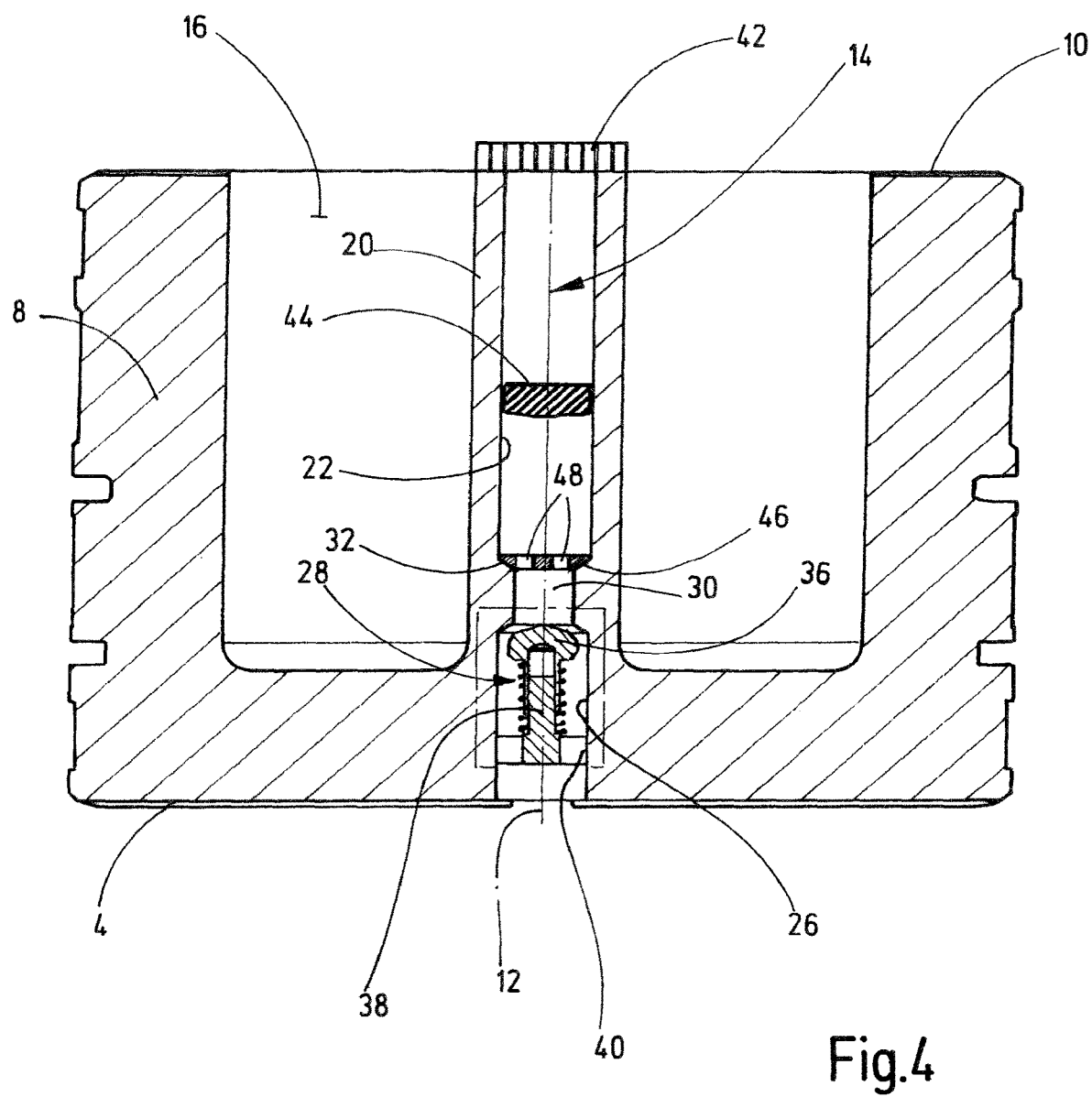

The second embodiment shown in FIGS. 3 and 4 matches the first embodiment, apart from the fact that instead of the float ball 24 in the guide 22, a rubber mat 44 is provided as a float body. The rubber mat 44, as shown in FIG. 4, floats in the presence of a liquid. The rubber mat 44, in the absence of liquid, does not directly abut the seal seat 32 formed at the narrowing of the intermediate section 30 of the passage 14, but abuts a plate 46 of plastic or steel forming a counter surface or a sealing surface. The plate 46 has passages 48 for liquid. In the absence of a liquid, the rubber mat 44 forming a float body seals the passages 48 by abutting the plate 46, so that the mode of operation of the second embodiment corresponds to that of the first embodiment.

Figure 5:
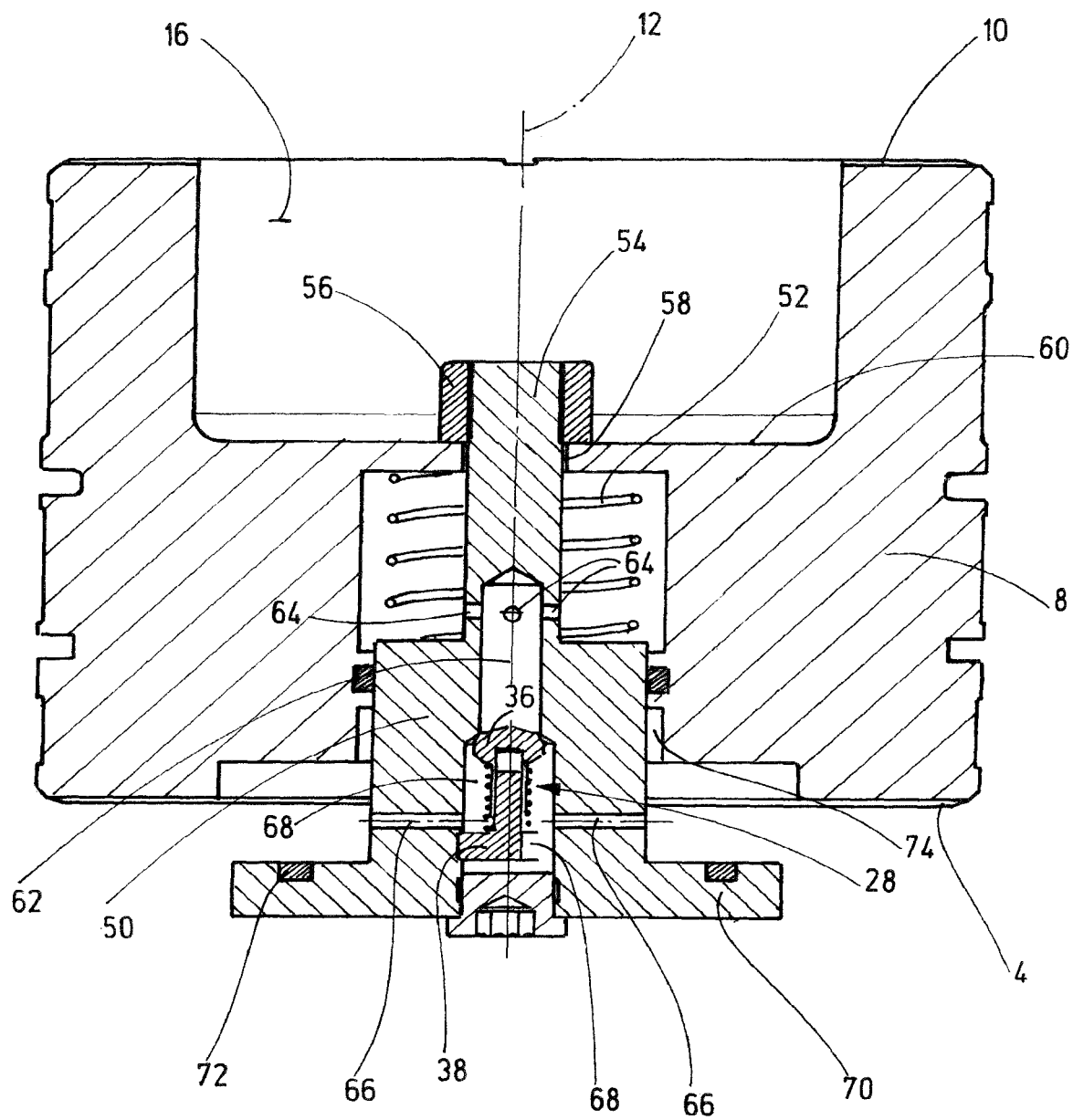
FIGS. 5 and 6 are side views in section of a separating piston of a piston accumulator according to a third exemplary embodiment of the invention, wherein the first operating state and the second operating state of the return device, respectively, are shown.

In the third embodiment shown in FIGS. 5 and 6, the return device has a control piston 50 guided in the separating piston 8 for movement in the axial direction. The control piston 50 is preloaded by a compression spring 52 in an extended end position in the direction of the liquid side 4. To limit the extension motion in the end position shown in FIG. 5, an annular blocking body 56 is attached to the piston rod-shaped end part 54 of the control piston 50. The end part 54 extends through a passage 58 into the inner cavity 16 of the separating piston 8. The blocking body 56, as a stop, is supported on the bottom 60 of the cavity 16. There is a filling chamber 62 coaxial with axis 12 in the control piston 50. The filling chamber 62 can be filled with transitioned liquid from the cavity 16 via the passage 58 and transverse bores 64 of the piston 50. In the control piston 50 are transverse channels 66 extending between the outside of the piston and the end area 68, facing the liquid side 4, of the filling chamber 62. As in the first two embodiments, the standard non-return valve 28, which blocks in the direction of the gas side 10, is provided as a blocking element that can be opened by differential pressure. The blocking element normally blocks the connection between the transverse channels 66 leading to the outside of the piston and the part, facing the gas side 10, of the filling chamber 62. FIG. 5 shows the position of the control piston 50 shifted by the action of the compression spring 52. That position matches the open position, in which the transverse channels 66 are open towards the liquid side 4. To initiate a return process, the liquid pressure on the liquid side 4 is reduced in relation to the gas pressure on the gas side 10 to such an extent that the separating piston 8 moves into a position, in which the control piston 50 runs up against and contacts the end cover 6. The control piston 50 is then slightly slid in from the fully extended position of FIG. 5 against the action of the compression spring 52. Because of the pressure difference between the gas side 10 and the liquid side 4 resulting from the support of the compression spring 52, the non-return valve 28, which is set to a low closing pressure, opens, starting the return process and liquid from the cavity 16 flows back to the liquid side 4 via the passage 58, the filling chamber 62 and the transverse channels 66. In the unpressurized state of the liquid side 4, when the separating piston 8 rests against the end cover 6 under the total gas pressure of the gas side 10 and the control piston 50 is fully retracted, as shown in FIG. 6, a sealing ring 72 of a closing element 70, projecting in a flange-shaped manner from the control piston 50, abuts in a sealing manner at the separating piston 8. In this way in the event of an unpressurized liquid side 4 a loss of gas from the gas side 10 is prevented. As FIGS. 5 and 6 show, the guide of the control piston 50 has an extension 74, so that the inlets of the transverse channels 66 are free even when the control piston 50 is pushed-in. The connection between the gas side 10 and the liquid side 4 is therefore only disrupted when the closing element 70 comes into sealing contact with the separating piston 8 when the control piston 50 is fully retracted.

FIGS. 7 and 8, in which a fourth embodiment of the invention is shown, show a lower section of the accumulator housing 2 of the piston accumulator having an attached end cover 6, which forms the closure of the liquid side 4. These parts have been omitted in FIGS. 1 to 6, which only show the separating piston 8. In the embodiment of FIGS. 7 and 8, the return device has an actuating piston 78 formed as an annular body. The actuating piston 78 can be moved axially in an annular chamber 80 of the end cover 6, which forms a pressure chamber 82 adjoining the inner piston surface. In the annular chamber 80, the actuating piston 78 can be extended out of the end cover 6 into an end position by pressurizing the pressure chamber 82. That end position is limited by a stop 84. Compression springs 88 support or bias the actuating piston 78 against the extending motion. Compression springs 88 are located in an annular recess 86 in the facing side of the annular piston 8. As shown in FIGS. 7 and 8, at least one connecting channel 90 is formed in the separating piston 8. The respective connecting channel 90 leads from the piston cavity 16 into the recess 86. In the connecting channel 90, a spring preloaded non-return valve 92 is arranged. Its closing element 94 is attached to the end of a control pin 96, which extends into the recess 86 and, in that way, passes through the compression spring 88 located in this recess 86. In the state of FIG. 7, in which the return state is shown, the control pin 96 is supported by the actuating piston 78, because the actuating piston 78 is extended by pressurizing the pressure chamber 82 against the action of the compression springs 88 until it comes to rest against the stop 84. As a result, the control pin 96 is displaced against the action of the closing spring of the non-return valve 92, opening the valve 92. In contrast, FIG. 8 shows the operating state, in which the pressure chamber 82 is relieved, resulting in the actuating piston 78 being retracted into the end cover 6 by the compression springs 88, the control pin 96 then being no longer supported and therefore the non-return valve 92 being closed.

To determine the level N of liquid transitioned to the gas side 10, an ultrasonic sensor 76 is provided on the accumulator housing 2. Sensor 76 signals the liquid level via a UP switch to an electronic control 98, which controls a control valve 100. At a level N of accumulated liquid at the gas side, as illustrated in FIG. 7, the sensor 76 generates a signal for the electronic control 98 that a return process must be initiated. To do so, the control valve 100 opens, so that the pressure chamber 82 is supplied with the pressure of the liquid side 4. The actuating piston 78 is then pressurized and extends into the position shown in FIG. 7. Then, the control valve 100 is closed, so that the actuating piston 78 remains pressurized. By reducing the pressure of the liquid side 4, which results in the separating piston 8 running up against the end cover 6, the control pin 96 of the non-return valve 92 is supported by the actuating piston 78, thereby moving the non-return valve 92 into the open position, so that the liquid flows back to the liquid side 4 via the channel 90 and the recess 86. As soon as the sensor 76 no longer signals the presence of liquid, the control valve 100 is opened again, so that the pressure chamber 82 is depressurized, the actuating piston 78 retracts again because of the action of the compression springs 88, the control pin 96 is relieved as a result and the non-return valve 92 closes again. Once this return process is completed, the piston accumulator can be operated again for a subsequent operating cycle. In FIGS. 7 and 8 only one channel 90 each having one non-return valve 92 each is shown. However, more than one non-return valve 92 can be provided in an assigned channel 90 in the separating piston 8.

While various embodiments have been chosen to illustrate the invention, it will be understood by those skilled in the art that various changes and modifications can be made therein without departing from the scope of the invention as defined in the claims.

What is claimed is:

1. A piston accumulator, comprising:
an accumulator housing having a gas side and a liquid side in the accumulator housing;
a separating piston being guided for longitudinal motion in the accumulator housing and separating the liquid side from the gas side; and
a return device in the separating piston being capable of at least partially returning transitioned liquid transitioned from the liquid side to the gas side despite a piston seal on the separating piston back to the liquid side, the return device including a control piston movably guided in the separating piston, the control piston having an inner chamber being inside the control piston and being fillable with the transitioned liquid, the control piston being movable into an open position by the action of an energy storage device, in the open position the inner chamber is connected in fluid communication to the liquid side via a non-return valve blocking fluid flow in a direction of the gas side, the control piston being movable into a blocking position in which a closing element located on the control piston blocks fluid communication between the inner chamber and the liquid side upon the control piston contacting an end cover of the accumulator housing and being fully retracted.

2. The piston accumulator according to claim 1 wherein the control piston is movably guided in a passage in the separating piston, the closing element extending radially outwardly relative to axial movement of the control piston beyond fluid flow passages in the control piston.

3. The piston accumulator according to claim 2 wherein the fluid flow passages extend through the control piston providing fluid communication between the inner chamber and an outer surface of the control piston.

4. The piston accumulator according to claim 3 wherein the fluid flow passages extend radially relative to the axial movement of the control piston adjacent opposite axial ends of the inner chamber.

5. The piston accumulator according to claim 4 wherein the non-return valve is in the inner chamber between the axial ends of the inner chamber.

6. The piston accumulator according to claim 2 wherein the closing element has an annular seal on a surface thereof facing a liquid side surface of the separating piston.

7. The piston accumulator according to claim 2 wherein the closing element is received in a recess in a liquid side surface of the separating piston in the blocking position of the control piston.

8. The piston accumulator according to claim 1 wherein the inner chamber is in fluid communication with the liquid side of the separating piston through a fluid flow passage in all positions of the control piston except for the blocking position of the control piston.

9. The piston accumulator according to claim 1 wherein the control piston has a blocking body on an axial end of the control piston extending into the gas side and engaging a gas side surface of the separating piston limiting movement of the control piston in the open position of the control piston.

* * * * *